United States Patent Office

3,395,969
Patented Aug. 6, 1968

3,395,969
METHOD FOR DYEING POLYOLEFIN SHAPED ARTICLES
Shogo Matsuda, Takatsuki-shi, and Kenzo Takagi, Hirakata-shi, Japan, assignors to Asahi Kasei Kogyo Kabushiki Kaisha, Osaka, Japan, a corporation of Japan
No Drawing. Filed Dec. 16, 1964, Ser. No. 418,876
Claims priority, application Japan, Dec. 28, 1963, 38/70,496, 38/70,498
8 Claims. (Cl. 8—31)

ABSTRACT OF THE DISCLOSURE

An improved process for dyeing shaped articles of polyolefin containing a polytriazole compound, wherein the articles are treated with a monoepoxy compound containing a halogen atom or a double bond in the molecule, before or during the dyeing. By said treatment, the modifying agents in the polyolefin are significantly activated, and absorption and diffusion of a dye are readily carried out therein, and it has become possible to dye previously undyeable polyolefins. The colors dyed according to the present process are very fast. Acid, metallized, acid mordant and reactive dyes can be employed for the present process.

---

This invention relates to an improvement in dyeing of polyolefin shaped articles containing a polytriazole compound.

Amongst methods for improving dyeability of polyolefin shaped articles, there is known a method which is characterized by producing polyolefin shaped articles containing polyethyleneimines, polyamides, polyurethanes, polyureas, polyvinyl pyridines or epoxy resin having affinity to acid dyes and dyeing said polyolefin articles with acid dyes. However it is not always possible to obtain a sufficient improvement in the dyeability by simply incorporating a basic nitrogen compound into the polyolefin. In other words, when a polyolefin shaped article containing a basic nitrogen compound is subjected to dyeing directly with an acid dye without being subjected to pretreatment it frequently happens that only poor dyeability is effected.

It is believed that the cause of this lies in the stripping-off of the basic nitrogen compound included in polyolefin into the dye bath during the time of dyeing. However, according to our experience it is certain that the cause of this fact is not only due to the stripping off of basic nitrogen compound but it is also due to a further important factor. Many examples have been observed in which the dyeability does not increase by simply converting readily soluble basic nitrogen compounds into insoluble compounds by way of a compound having only epoxy rings. Further, as in the case of a certain polytriazole compound, there is a case of a basic nitrogen compound which has no possibility of being stripped. Even when it is incorporated into polyolefin shaped articles, the resulting shaped articles cannot be dyed effectively with acid dyes. The reasons for the above-mentioned facts are believed to lie in the following points. Firstly, in the case of the basic nitrogen compound included in polyolefin shaped articles being made into insoluble form and also in the case of the basic nitrogen compound having no possibility of being stripped off, being incorporated, these nitrogen compounds exist in a state such that they are sparsely but intimately enclosed with and imbedded in the ground material of the hydrophobic polyolefin. On this account, the activity of the basic nitrogen compound as the dye sites, is reduced and such a nitrogen compound cannot be used effectively as dye sites. Secondly, since the acid dyes are decidedly hydrophilic it is difficult to diffuse them into the interior of the polyolefin. In this regard they are different from other dyes for polyolefins and disperse dyes and as such require a certain aid to enable their dye molecules to reach the dye sites.

An object of the present invention is to provide a method for dyeing polyolefin shaped articles which has overcome the above-mentioned disadvantages. In other words, it is to provide a method which can be effectively, and with little difficulty applied, when the dye used is acid dyes, acid mordant dyes or reactive dyes. The object of the present invention can be attained by treating polyolefin shaped articles containing a polytriazole compound with a monoepoxy compound containing halogens or double bonds in the molecule.

The method of the present invention differs from prior art method in following points.

When polyolefin articles containing a polytriazole compound are treated with a monoepoxy compound containing halogens or double bonds in the molecule, on adding epoxy radicals to the nitrogen compounds, a part of the halogen atoms or double bonds simultaneously makes addition bonds with the polytriazole compound and prevents the polytriazole compound from being stripped off by indicating a cross-linking effect. Further important points are that the epoxy radical itself, the radical produced by the decomposition of the epoxy radical or the residual radical of the double bond act as affinity increasing points and because of their affinity to water molecules halogens or double bonds enhances the to-water-affinity of the environment of the polytriazole compound and establish for hydrophilic acid dyes an extremely advantageous atmosphere to diffuse or to be adsorbed. When polyolefin articles containing a polytriazole compound are treated with a monoepoxy compound containing halogens or double bonds, the improvement to dyeability is notable when compared with the case when they are treated with an epoxy compound containing no halogen or double bond. It is entirely due to the above-mentioned effects beside the prevention of the polytriazole compound from being stripped off. In cases of conventional epoxy compounds containing no halogens or double bonds, the improving effect of dyeability is observed with some basic nitrogen compounds, but hardly or slightly with other basic nitrogen compounds. However, when the epoxy compounds containing halogens or double bonds is subjected to pretreat polyolefin containing a polytriazole compound, the effect to the polytriazole compound included in polyolefin is quite distinct.

According to the present invention, polyolefin shaped articles containing 1 to 10 percent by weight of a polytriazole compound, e.g., polypropylene fibers or films which are desired to be dyed with acid dyes, acid mordant dyes or reactive dyes are treated with a short chain aliphatic epoxy compound containing a halogen or double bond, e.g., vinyl group, a solution thereof, or an emulsion thereof, or the like prior to dyeing. Alternatively they can be simultaneously treated and dyed by the same bath. By either of these methods, it is possible to carry out dyeing quiet effectively.

The treatment with such an epoxy compound can be carried out at a temperature ranging from room temperature to 130° C., for a period of time ranging from 2 to 3 seconds to 48 hours in either a batch or continuous process.

The polytriazole type compounds having the following general formula are used in the present invention and include polyaminotriazoles and polytriazoles:

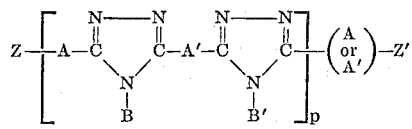

wherein A an A' are members selected from the group consisting of alkylene, phenylene, and cycloalkylene, the alkylene being represented by the formula $-(CH_2)_q-$ wherein $q$ is a number between 1 and 20; B and B' are members selected from the group consisting of hydrogen atom, alkyl group of 1 to 18 carbon atoms, amino group and a group of the formula $-(CH_2)_l-NH_2$ wherein $l$ is a number between 1 and 18; Z and Z' are members selected from the group consisting of carboxyl, hydrazide, amide and 4-amino-1,2,4-triazole having an alkyl substituent in the position of 3 or 5; and $p$ is a number between 1 and 200.

The monoepoxy compounds include as halogen-containing compounds, epihalohydrins such as epichlorohydrin, mono- or polyethylene glycol chlorohydrin monoglycidyl ethers and the like, trimethyl glycidyl ammonium chloride, triethyl glycidyl ammonium chloride and, as compounds containing at least one double bond, glycidyl methacrylate, glycidyl crotonate, glycidyl oleate, allyl glycidyl ether, crotyl gycidyl ether and the like.

Another procedure included in the present invention is the dyeing of the modified polyolefin shaped articles of which the affinity to dyes is enhanced by the above-mentioned treatment, in a dye bath in which from 0.5 to 10 g./l. of at least one compound selected from the group consisting of phenols, naphthols, and their derivatives, aromatic hydrocarbon and their derivatives is added so as to obtain a deep color in a relatively short period of dyeing time. Particularly when metal complex dyes having large molecules are used, the dyeability is notably increased with the above-mentioned compounds.

In the practice of dyeing, the above-mentioned compounds are added to a dye bath in emulsified and dispersed form in an amount of 0.5 to 10 g./l. (as pure material). Since the diffusion of dyes is sufficient in such instance, the dye exhaustion is exceedingly high and the fastness to laundry and to crocking of dyed articles are superior. When the treatment with an epoxy compound and the dyeing are carried out simultaneously, it is possible to add the above-mentioned compound to the same bath.

The phenols and naphthols of the present invention include ortho-phenylphenol, alpha-, beta-naphthol, phenol, ortho-, meta- and para-cresol, ortho-, meta-, para-xylenol, mono-, chlorophenol and the like. The aromatic hydrocarbon derivatives include, as compounds substituted with halogen, monochlorobenzene, ortho-dichlorobenzene, 1,2,4-trichlorobenzene, benzyl chloride and as compounds substituted with alkyl radical, toluene, ortho-, meta- and para-xylene, alpha-methyl naphthalene and as compounds substituted with phenyl, biphenyl and the like.

The following examples are given to illustrate the present invention without limiting its scope.

Example 1

5 percent by weight of polytetramethylene aminotriazole (pH=10) was admixed to isotactic polypropylene and the blends wer subjected to the melt-spinning at 260° C. to yield filament yarns of 180 denier/30 filaments. The fibers were treated in a bath of 2 g./l. aqueous emulsion of glycidyl methacrylate (GMA) with a bath ratio of 1:50, at 100° C. for 45 minutes. After this treatment the fibers were washed with warm water sufficiently and dried. The fibers were dyed in a bath containing 5 percent O.W.F. of blue-violet 1:2 metal complex dye having the following formula and 5 g./l. of ortho-dichlorobenzene emulsified with a nonionic and anionic surfactant with a bath ratio of 1:30 at 100° C. for 16 minutes.

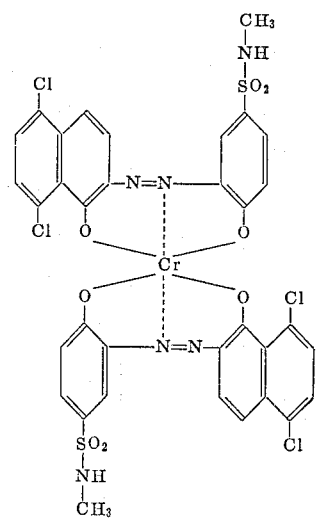

After dyeing, the after-scouring was carried out in a bath containing 3 g./l. of nonionic agent at 70° C. for 20 minutes. The whole amount of dyes (5.0 O.W.F.) was exhausted. There were observed no stripping of dye and the dyed objects showed deep blue violet shade. The laundering fastness passed the 5th grade of AATCC 36–1957 (Test II) and the crocking fastness passed the 5th grade of AATCC 8–1957.

When the dyeing was carried out without using o-dichlorobenzene, the dye exhaustion was only 2.60 percent O.W.F.

In the dyeing method which aims at heavy shade by simultaneous use of organic compounds such as phenols, naphthols, and the like, the fibers containing, as a basic nitrogen compound, particularly polytriazole type compound showed, as in the instant example, stabilized dyeability.

Example 2

5 percent by weight of copolymer of poly(octamethylene-4-lauryltriazole) and poly(octamethylene-4-aminotriazole) (pH=5) was admixed to isotatic polypropylene and subjected to the melt-spinning at 260° C. thereby to produce filaments yarns of 90 denier/15 filaments. The yarns were treated with aqueous solution of 15 g./l. epichlorohydrin with a bath ratio of 1:50, at 100° C. for 45 minutes. The yarns were dyed in a bath which contains 5 percent O.W.F. of Diamond Chrome Blue Black B (C.I. Mordant Black 13, 63,615) and 3 g./l. of ortho-phenylphenol (OPP) and of which pH was controlled at 6 with acetic acid, with a bath ratio of 1:50, at 100° C. for 90 minutes. The dye exhaustion was complete ( 5 percent O.W.F.). Subsequently the dyed fibers were subjected to after-chroming in a bath containing 25 percent O.W.F. of $K_2Cr_2O_7$ and having sulfuric acid acidity of pH 3 at 100° C. for 30 minutes and further to scouring in a bath of 3 g./l. of nonionic detergent at 70° C. for 20 minutes whereby dyed objects of deep blue black shade were obtained. The laundering fastness and the crocking fastness of dyed objects were in the 5th grade of AATCC 36–1957 (Test II) and in the 5th grade of AATCC 8–1957 respectively.

From the foregoing facts it was evident that the method for obtaining heavy shades of high fastness to laundering and crocking by simultaneous use of an epoxy compound and an organic compound such as phenols, or aromatic hydrocarbon derivatives expresses its effect surely and completely when the kind of fibers were limited to those containing polytriazole type compound.

Example 3

The same fibers used in Example 2 were sufficiently washed with warm water at about 70° C. after being treated with an aqueous solution of 20 g./l. epichlorohydrin with a bath ratio of 1:30, at 100° C. for 45 minutes. The fibers were then dyed in a bath which contains 3 percent O.W.F. of reactive dye, Reactone Red 9B having a following general formula and 6 g./l. of orthophenyl phenol and of which pH was controlled at 6 with acetic acid, at 100° C. for 90 minutes;

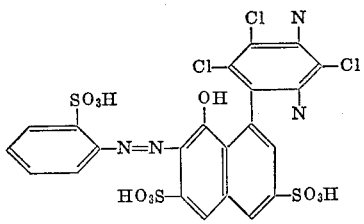

After being dyed, the fibers were subjected to after-scouring in a bath containing 3 g./l. of nonionic detergent at 80° C. for 15 minutes, whereby deep, bright red shade was obtained. The whole dye amounting to 3 percent O.W.F. was exhausted. As for fastness of dyed products, laundering passed the 5th grade of AATCC 36–1957 (Test II) and crocking passed the 4th grade of AATCC 8–1957. When the same fibers were dyed without using OPP, the dye exhaustion was 0.33 percent O.W.F. and objects of only very pale shade were obtained.

Example 4

5 percent by weight of poly(cyclohexylene-4-tertiary butyltriazole-cyclohexylene - 4 - aminotriazole) (pH=4) was admixed with low pressure polyethylene and the blends were subjected to the melt-spinning to yield filament yarn of 180 denier/30 filaments. The fibers were treated in a bath of 20 g./l. aqueous emulsion of glycidyl crotonate with a bath ratio of 1:40, at 100° C. for 60 minutes. After the bath was cooled to about 50° C., 3% O.W.F. of Coomassie Fast Green GN (C.I. Acid Green 25, 61,570) was added into the bath and of which pH was controlled at 3 with acetic acid.

The temperature of the bath was raised again to boiling point and dyeing was continued for 60 minutes at 100° C.

After dyeing, the dyed fibers were scoured in a bath containing 3 g./l. marcel soap at 60° C. for 15 minutes to remove the residual dyes on the fibers. The measured dyeability was 2.7% O.W.F.

The dyed objects showed a medium to deep bluish green and passed the 5th grade of laundering fastness of AATCC 36–1957 (Test II).

Example 5

5 percent by weight of a condensation copolymer (pH=5) obtained by reacting 80 percent by mol of sebacic acid dihydrazide with 20 percent by mol of isophthalic acid dihydrazide was admixed with 95 percent by weight of polybutene-1 pellet and subjected to the melt-spinning to produce filament yarns of 180 denier/30 filaments. The fibers were treated in a bath containing 20 g./l. of triethyl glycidyl ammonium chloride at 100° C. for 60 minutes. After pre-treating the fibers were washed with warm water at about 70° C. and dyed in the new bath containing 3.0% O.W.F. of Acid Orange II (C.I. Acid Orange 7, 15,510) and previously emulsified and dispersed 5 g./l. of biphenyl and of which pH was controlled at 3 with acetic acid, at 100° C. for 90 minutes.

The dyed objects showed a bright and deep orange shade and fastness to laundering passed the 3rd grade of AATCC 36–1957 (Test II). When the same fibers were treated with the compound containing no epoxy group in the molecule, i.e.

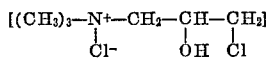

and dyed, the objects of only pale shade were obtained.

From the foregoing facts, it was evident that the difference of effectiveness between a compound with an epoxy group and the one without an epoxy compound is remarkable.

Example 6

5 percent by weight of poly(octamethylene-4-aminotriazole - octamethylene - 4 - hexamethyleneaminetriazole) (pH=6) which was obtained by reacting polyoctamethylene aminotriazole with hexamethylene diamine was admixed with low pressure polyethylene resin and the blends were subjected to the meltspinning to produce cut fibers of 10 denier, 3 inches cut length.

The fibers were dipped in aqueous solution of 60 g./l. of 1-chloro-3-ethoxy-2-propanol glycidyl ether at room temperature for one minute and squeezed through the mangle. The fibers were steamed at 103° C. for 20 minutes and sufficiently washed and dried. The dyeing was carried out in a bath containing 4.0% O.W.F. of Erio Violet RL (C.I. Acid Violet 1, 17,025).

What we claim is:

1. In a process for dyeing a shaped article of a polyolefin selected from the group consisting of polyethylene, polypropylene and polybutenes, said polyolefin being modified by the addition thereto of a polytriazole, an improvement comprising treating said articles with a short chain aliphatic monoepoxy compound containing a halogen or a vinyl group.

2. A process as claimed in claim 1 comprising dyeing said articles in a dye bath including said monoepoxy compound.

3. A process as claimed in claim 1 comprising pretreating the polyolefin article with said monoepoxy compound.

4. A process as claimed in claim 1 comprising dyeing the polyolefin articles in a dye bath including both said monoepoxy compound and at least one compound selected from the group consisting of phenol, naphthols, halogen-substituted aromatic hydrocarbons, alkyl-substituted aromatic hydrocarbons and phenyl-substituted aromatic hydrocarbons.

5. In a process for dyeing a shaped article of a polyolefin selected from the group consisting of polyethylene, polypropylene and polybutenes, said polyolefin being modified by the addition thereto of a material having the general formula;

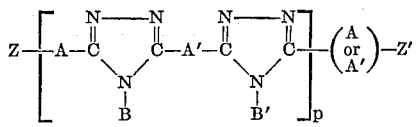

wherein A and A' are members selected from the group consisting of alkylene, phenylene and cycloalkylene, said alkylene being represented by the formula $-(CH_2)_q-$ wherein $q$ is 1–20; B and B' are members selected from the group consisting of hydrogen, alkyl groups of 1 to 18 carbon atoms, amino group and groups of the formula $-(CH_2)_l-NH_2$ wherein $l$ is 1–18; Z and Z' are members selected from the group consisting of carboxyl, hydrazide, amide and 4-amino-1,2,4-triazole having an alkyl substituent in the 3 or 5 position; $p$ is 1–200, an improvement comprising treating the polyolefin with a short chain aliphatic monoepoxy compound containing a halogen or a vinyl group in the molecule.

6. A process as claimed in claim 5 comprising dyeing said articles in a dye bath including said monoepoxy compound.

7. A process as claimed in claim 5 comprising pretreating the polyolefin articles with said monoepoxy compound.

8. A process as claimed in claim 5 comprising dyeing the polyolefin articles in a dye bath including both said monoepoxy compound and at least one compound selected from the group consisting of phenol, naphthols, halogen-substituted aromatic hydrocarbons, alkyl-substituted aromatic hydrocarbons and phenyl-substituted aromatic hydrocarbons.

References Cited

UNITED STATES PATENTS

| | | | |
|---|---|---|---|
| 2,183,754 | 12/1939 | Schlack | 8—57 |
| 2,762,719 | 9/1956 | Kleiner | 8—18 |
| 3,046,075 | 7/1962 | Kantner et al. | 8—17 |
| 3,107,228 | 10/1963 | Cappuccio et al. | |
| 3,182,105 | 5/1965 | Bonivicini et al. | |
| 3,215,487 | 11/1965 | Cappuccio et al. | 8—115.5 |
| 3,294,864 | 12/1966 | Karoly et al. | |
| 3,316,054 | 4/1967 | Tsunoda et al. | |
| 3,232,691 | 2/1966 | Wilhelm | 8—18 |

FOREIGN PATENTS

| | | |
|---|---|---|
| 600,748 | 6/1960 | Canada. |
| 1,325,389 | 3/1963 | France. |

NORMAN G. TORCHIN, *Primary Examiner.*

DONALD LEVY, *Assistant Examiner.*